No. 808,102. PATENTED DEC. 26, 1905.
L. P. MATTLE.
FISH CATCHING APPARATUS.
APPLICATION FILED SEPT. 9, 1905.
2 SHEETS—SHEET 2.
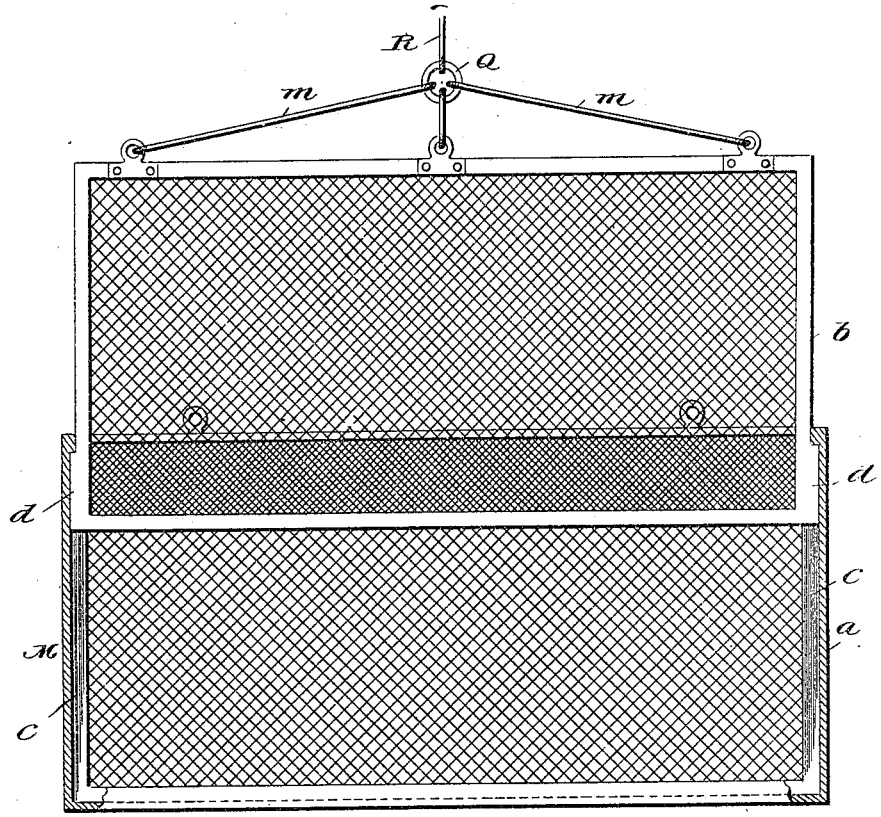
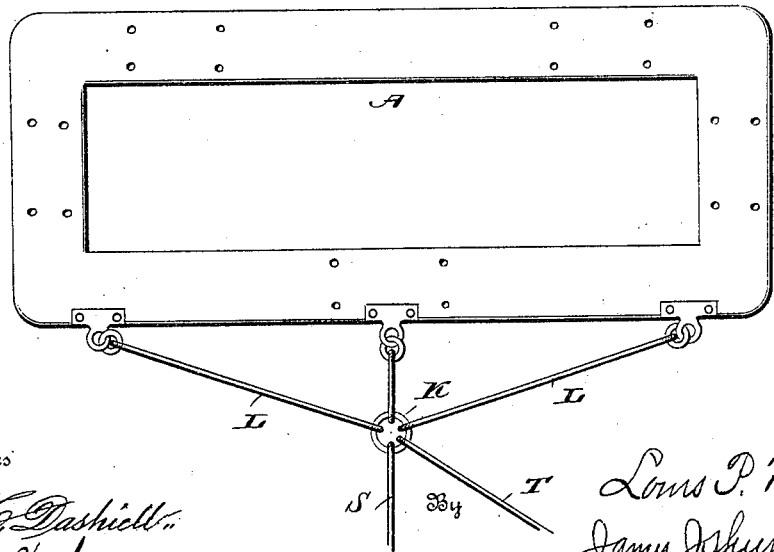

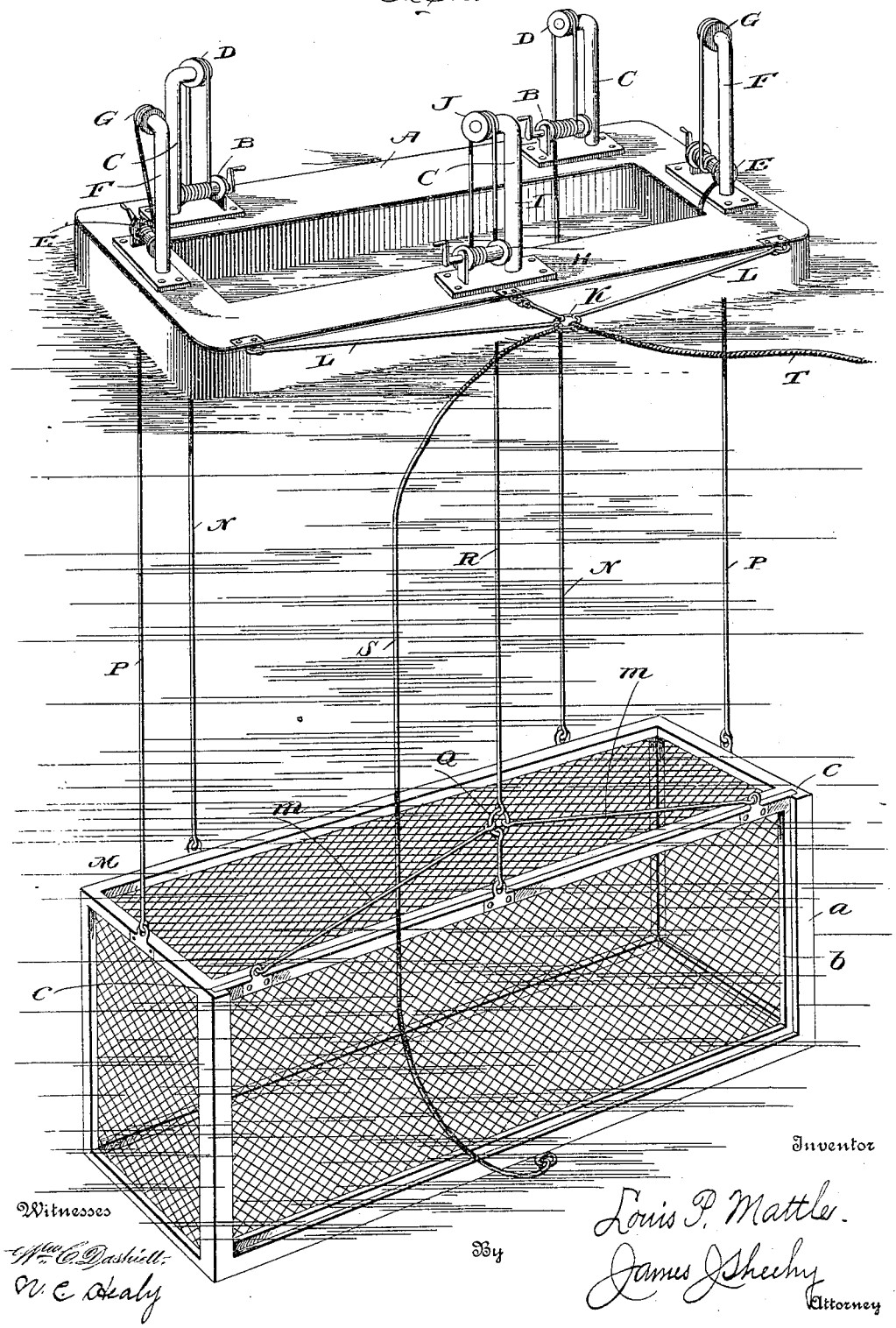

UNITED STATES PATENT OFFICE.

LOUIS P. MATTLE, OF NEW ORLEANS, LOUISIANA.

FISH-CATCHING APPARATUS.

No. 808,102.   Specification of Letters Patent.   Patented Dec. 26, 1905.

Application filed September 9, 1905. Serial No. 277,705.

*To all whom it may concern:*

Be it known that I, LOUIS P. MATTLE, a citizen of the United States, residing at New Orleans, in the parish of Orleans and State of Louisiana, have invented new and useful Improvements in Fish-Catching Apparatus, of which the following is a specification.

My invention has reference to fish-catching apparatus of the floating type, and its utility and practical advantages will be fully understood from the following description when the same is considered in connection with the accompanying drawings, forming part of this specification, in which—

Figure 1 is a perspective view illustrating the cage of my improvements as the same appears when lowered from the float. Fig. 2 is a front elevation of the cage with the door thereof in its raised position, and Fig. 3 is a top plan view of the float with the appurtenances for raisin gthe cage and the gate omitted.

Similar characters designate corresponding parts in all of the views of the drawings, referring to which—

A is the float of my novel apparatus, which is in the form of an open frame, Figs. 1 and 3.

B B are windlasses located on the rear portion of the float A.

C C are supports rising from the rear portion of the float at points adjacent to the windlasses and bearing sheaves or pulleys D.

E E are windlasses located on the end portions of the float.

F F are supports arranged adjacent to the windlasses E and bearing sheaves or pulleys G.

H is a windlass arranged on the front portion of the float, and I is a support disposed adjacent to the latter windlass and bearing a sheave J.

The windlasses and sheaves described have to do with the raising and lowering of the case, presently described, and in addition to the same the float is provided with a ring K. This ring is disposed in front of the float and is connected therewith through the medium of three (more or less) links L. (Best shown in Fig. 3.)

M is the cage of my novel apparatus. This cage comprises a body *a*, formed by a frame and walls of reticulated material and open at its forward side, Fig. 2, and a front vertically-slidable gate *b*, disposed in guideways *c* of the body and having stops *d*, Fig. 2, whereby it is impossible to withdraw it entirely from the body.

N N are cables extending between and connected to the rear upper portion of the cage-body *a* and the windlasses B and passed over the sheaves D.

P P are cables extending between and connected to the ends of the cage-body *a* and the windlasses E and passed over the sheaves G.

Q, Fig. 1, is a ring connected by links *m* to the middle portion and end portions of the gate *b*.

R is a cable connecting the said ring and the windlass H and passed over the sheave J, and S is a cable extending between and connected to the lower portion of the front of the cage-body *a* and the ring K, before described.

It will be apparent from the foregoing that through the medium of the windlasses B and E and the connections described the cage M may be quickly and easily lowered and raised by persons standing on the float, and it will also be apparent that by operating the windlass H one of such persons is enabled to expeditiously open and close the gate *b* of the cage M.

In the practical use of my novel apparatus the cage M is lowered to the depth desired, and the gate *b* of said cage is opened to the full extent. The float A is then attached to a suitable towboat through a cable T, connected to the ring K, and the apparatus as a whole is drawn through the water, the cage trailing below and behind the float, as will be readily understood. After the apparatus has thus been towed through the water for a sufficient time the windlass H is operated to lower the gate of the cage, when, as will be readily appreciated, the catch of fish will be trapped in the cage. With this done the cage is raised to and through the opening in the float and is discharged of its contents by raising the gate *b* or in any other suitable manner. Incident to the towing of the apparatus through the water in the manner described the cable S coöperating with the cables N and P will assure the cage remaining in the position shown in Fig. 1—*i. e.*, with its open side foremost.

When desired, my apparatus may be used to advantage while the float A is at anchor, the cage M being lowered to the bottom with the gate *b* open, and then after a certain period of time the gate is closed and the cage raised to and through the opening in the float A. It will further be observed that when the cage M is drawn up into the float A and suitably secured my apparatus constitutes a convenient and advantageous means for carrying fish in the water.

In addition to the advantages which I have hereinbefore ascribed to my novel apparatus it wil be observed that the apparatus is simple and inexpensive in construction, requires but few men to properly operate it, and is well adapted to withstand the rough usage to which such apparatus is ordinarily subjected.

Having described my invention, what I claim, and desire to secure by Letters Patent, is—

1. A fish-catching apparatus comprising a float, a cage having an opening and a gate controlling said opening, cables connected to the body of the cage, a cable connected to the door of the cage, and means on the float for taking up and letting out the said cables.

2. A fish-catching apparatus comprising a float, a cage having an opening and a gate controlling said opening, cables connected to the body of the cage, a cable connected to the door of the cage, means on the float for taking up and letting out the said cables, a ring connected to the front portion of the float and adapted for the connection of a tow-line, and a cable S intermediate the body of the cage and the said ring.

3. A fish-catching apparatus comprising a float having a central opening, a cage of a size to enter the opening in the float; said cage having an opening and a gate controlling said opening, cables connected to the body of the cage, a cable connected to the gate of the cage, and means on the float for taking up and letting out said cables.

4. A fish-catching apparatus comprising a float having a central opening, a cage of a size to enter the opening in the float; said cage having an opening and a gate controlling said opening, cables connected to the body of the cage, a cable connected to the gate of the cage, windlasses on the float for taking up and letting out said cables, a ring connected to the front portion of the float and adapted for the connection of a tow-line, and a cable intermediate the body of the cage and said ring.

In testimony whereof I have hereunto set my hand in presence of two subscribing witnesses.

LOUIS P. MATTLE.

Witnesses:
J. M. GUINTERO,
LOUIS P. BRYANT.